(12) United States Patent
Brooks et al.

(10) Patent No.: US 6,691,922 B2
(45) Date of Patent: Feb. 17, 2004

(54) METHOD AND APPARATUS FOR ENCODING DATA IN LOGOS

(75) Inventors: David Brooks, Glendale, CA (US); Ackley Sprague, Toulouce (FR)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 10/033,945

(22) Filed: Dec. 27, 2001

(65) Prior Publication Data

US 2002/0134846 A1 Sep. 26, 2002

Related U.S. Application Data

(60) Provisional application No. 60/258,519, filed on Dec. 28, 2000.

(51) Int. Cl.[7] ................................................. G06K 7/10
(52) U.S. Cl. ................................... 235/494; 235/462.01
(58) Field of Search .................... 235/462.01, 462.02, 235/462.03–462.25, 462.26–462.48, 472.01, 472.02, 468, 470, 494

(56) References Cited

U.S. PATENT DOCUMENTS

| | | | | | |
|---|---|---|---|---|---|
| 4,359,633 A | * | 11/1982 | Bianco | ....................... | 235/468 |
| 5,288,986 A | * | 2/1994 | Pine et al. | ................... | 235/494 |
| 5,314,337 A | * | 5/1994 | Dixon | ......................... | 434/227 |
| 5,369,261 A | * | 11/1994 | Shamir | ....................... | 235/469 |
| 5,518,273 A | * | 5/1996 | Olson | .......................... | 283/36 |
| 5,568,555 A | * | 10/1996 | Shamir | ....................... | 380/51 |
| 5,616,911 A | * | 4/1997 | Jagielinski | .................. | 235/493 |
| 5,682,030 A | * | 10/1997 | Kubon | .................. | 235/462.25 |
| 6,044,182 A | * | 3/2000 | Daly et al. | .................. | 382/284 |
| 6,070,805 A | * | 6/2000 | Kaufman et al. | ........... | 235/494 |
| 6,141,441 A | * | 10/2000 | Cass et al. | .................. | 382/166 |
| 6,278,992 B1 | * | 8/2001 | Curtis et al. | ................... | 707/3 |
| 6,354,502 B1 | * | 3/2002 | Hagstrom et al. | ..... | 235/462.04 |
| 2002/0020746 A1 | * | 2/2002 | Roustaei | ................ | 235/462.01 |

* cited by examiner

Primary Examiner—Thien M. Le
(74) Attorney, Agent, or Firm—Orum & Roth

(57) ABSTRACT

A machine readable symbology suitable for inclusion into larger symbols or markings with a minimum of visibility. The symbology data set has a majority of one color enabling data to be embedded within symbols that are of the same color. The most used characters of the data set have the highest proportion of the selected masking color.

13 Claims, 2 Drawing Sheets

METHOD AND APPARATUS FOR ENCODING DATA IN LOGOS

This application claims the benefit of provisional application No. 60/258,519 filed Dec. 28, 2000.

BACKGROUND OF THE INVENTION

1. Field of the Invention

The present invention is in the field of machine readable symbols. More specifically, the invention relates to machine readable symbols that may be integrated into existing packaging graphics or designs so as to conceal the symbols.

2. Description of the Related Art

Machine readable symbology and systems that interpret them are explained in detail in "The Bar Code Book" by Robert C. Palmer, incorporated herein by reference.

There is a symbology called Minicode that encodes higher resolution data within lower resolution cells. However, Minicode does not attempt to mesh with existing graphics, leaving a discernable "Barcode" block. "Invisible inks" have been attempted, but without success.

The current methods still "look like a bar code". Other symbols have been hidden by incorporation into designs, for example, making a bar code look like a cat-o-nine tails.

By encoding data in a logo, which already exists on a package, the data itself takes up no additional space. The biggest advantage is that the customer is not aware of any bar code at all and at check-out, is amazed that the product can still be scanned. All the productivity advantages of speed and accuracy are maintained without any visual ill-effects.

SUMMARY OF THE INVENTION

By using large areas of a single color, for example, white or black, and encoding characters that are mostly of that color, data can be "hidden" in logos or other graphic images. This solves the retailers problem of not wanting "computer codes" distracting from the look of their packaging.

DETAILED DESCRIPTION

Figure 1:
FIG. 1 is an example of a common graphic.
Figure 2:
FIG. 2 is the graphic of FIG. 1 with data encoded in it.
Figure 3:
FIG. 3 is similar to FIG. 2 but with different data.

The bitmap image, FIG. 1, is a random example of a logo (not intended to represent any licensed image). Notice that the ears are all black. The two modified logos, FIGS. 2 and 3, each are a different pattern of white dots within the black area encoding data. Note that the original appearance of the logo is maintained, even as data structure is attached to it. Generally data characters need to be mostly black, in this example, in order to make the ears still look dark. Some information density is lost due to this requirement. Dark cells can be printed in white backgrounds, but will be more apparent to the eye. In this case, 10 mil pixels are used, allowing approximately 12 digits per ear to be encoded with generous error correction. If a larger pixel is used, less data could be encoded, but a EAN.UCC number could be encoded using 15 mil cells in this example (14 digits total). The logo is readable by an imager suitably programmed. Internal features like the nose, outlines of the ears, the eyes and so forth can be used to orient and clock the data cells. Data could be encoded using well known character sets like Data Matrix (but with different symbol characters), or preferably by designing an optimized character set for high density numerics, or what ever the application requires.

93m Symbology, a specific matrix symbology, was developed for this purpose:

93m is a symbology with predominately black data characters utilizing the same codeword set and error correction method as 93i. It is intended to be incorporated into other graphics with significant areas of black so as to be not very noticeable. Several configurations are intended with the small end being 2 data codewords, then 10 data codewords (see example), and then 26 data codewords. Higher data capacity is possible.

Figure 4:
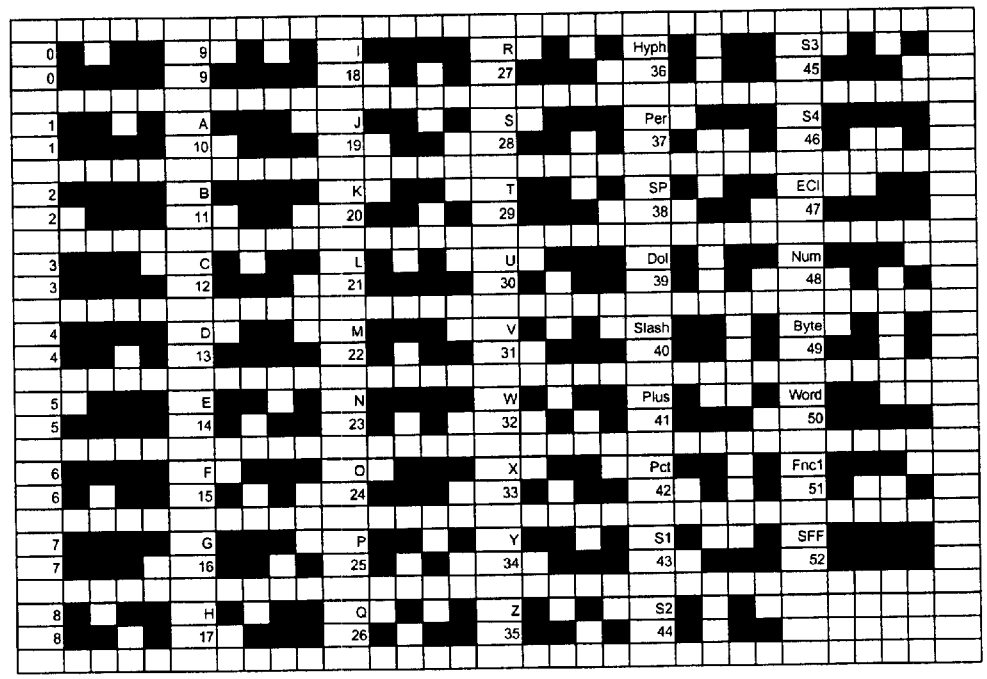
FIG. 4 is an example of a data set using the present invention.

The character set is arranged so that numbers, the most commonly used characters, have the most black, followed by the common letters, then the less common letters and then the special characters. The only departure from 93i is that the Special Features Flag (SFF) is used as a pad character. See FIG. 4.

Figure 5:
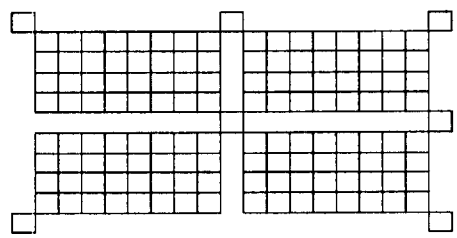
FIG. 5 is the grid pattern for the data set of FIG. 4.

The characters for the 16 codeword version are laid out in a grid with two codewords per row into 4 rows. Four white cells designate the corners. The center left and bottom cells are left black for orientation purposes. FIG. 5 is a picture of the cell grid.

Figure 6:
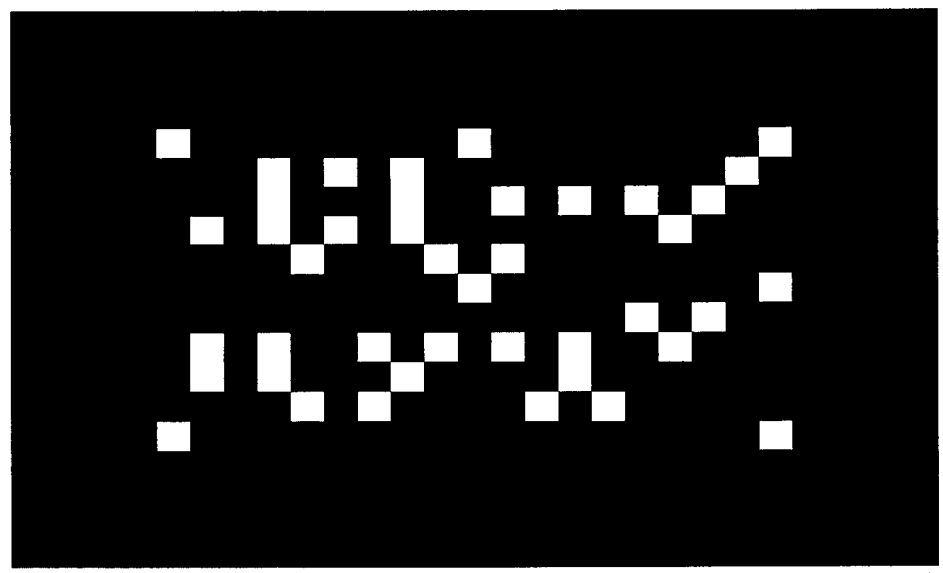
FIG. 6 is an example of the data "001234567890" applied using the data set of FIG. 4.

FIG. 6 is an example encoding the data "001234567890". The resulting codewords are the same as 93i, 40 49 18 48 0 2 27 45 18 23 18 26 52 25 14 27 (note that the SFF in the middle and the message length character are omitted). The codewords are laid out in a boustrophedonic fashion. Note that only 20% of the area is white.

Figure 7:
FIG. 7 is the symbol of FIG. 6 with an x-dimension of approximately 15 mils.

FIG. 7 has the same symbol using 93m encoding the EAN.UCC number "001234567890" with an X-dimension of approximately 15 mils.

What is claimed is:

1. A machine readable symbology comprising:
   a graphic having a data area comprised substantially of a first color;
   a data set embedded in the data area utilizing at least the first color and a second color;
   the data set selected, on average, to use a majority of the first color.

2. The machine readable symbology of claim 1 wherein:
   the data set has a subset of most commonly used characters and a remainder subset,
   the most commonly used characters having a higher percentage of the first color as compared to the remainder subset.

3. A symbol with machine readable data comprising:
   a data area within a graphic having a majority color;
   the data area having data encoded in a machine readable symbology which utilizes more than 50% of the majority color.

4. The machine readable symbology of claim 1 wherein the graphic is selected from the group consisting of a logo, an image, a design, or combinations thereof.

5. The machine readable symbology of claim 1 wherein said graphic has at least one feature and the at least one feature is used to orient the data set.

6. The machine readable symbology of claim 1 wherein the data set uses about 80% of the first color.

7. The machine readable symbology of claim 1 wherein the graphic is selected from the group consisting of a logo, an image, a design or combinations thereof and the graphic has at least one feature and the at least one feature is used to orient the data set.

8. The machine readable symbology of claim 7 wherein the data set uses about 80% of the first color.

9. The symbol of claim 3 wherein the graphic is selected from the group consisting of a logo, an image, a design or combinations thereof.

10. The symbol of claim 3 wherein said graphic has at least one feature and the at least one feature is used to orient the data.

11. The symbol of claim 3 wherein the machine readable symbology utilizes about 80% of the majority color.

12. The symbol of claim 3 wherein the graphic is selected from the group consisting of a logo, an image, a design or combinations thereof and the graphic has at least one feature and the at least one feature is used to orient the data.

13. The symbol of claim 12 wherein the machine readable symbology utilizes about 80% of the majority color.

\* \* \* \* \*